United States Patent
Kim et al.

(10) Patent No.: US 10,114,225 B2
(45) Date of Patent: Oct. 30, 2018

(54) DIRECTIONAL BACKLIGHT UNIT, THREE-DIMENSIONAL (3D) IMAGE DISPLAY APPARATUS, AND 3D IMAGE DISPLAYING METHOD

(71) Applicant: SAMSUNG ELECTRONICS CO., LTD., Suwon-si (KR)

(72) Inventors: Hyunjoon Kim, Seoul (KR); Joonyong Park, Suwon-si (KR); Bongsu Shin, Seoul (KR); Dongouk Kim, Pyeongtaek-si (KR); Jihyun Bae, Seoul (KR); Dongsik Shim, Hwaseong-si (KR); SungHoon Lee, Seoul (KR); Jaeseung Chung, Suwon-si (KR); Seogwoo Hong, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 18 days.

(21) Appl. No.: 15/269,136

(22) Filed: Sep. 19, 2016

(65) Prior Publication Data
US 2017/0212359 A1    Jul. 27, 2017

(30) Foreign Application Priority Data

Jan. 25, 2016    (KR) ......................... 10-2016-0008910

(51) Int. Cl.
*G02B 27/22*    (2018.01)
*F21V 8/00*    (2006.01)
(Continued)

(52) U.S. Cl.
CPC ......... *G02B 27/2214* (2013.01); *G02B 6/005* (2013.01); *G03H 1/2294* (2013.01);
(Continued)

(58) Field of Classification Search
CPC .. G02B 27/2214; G02B 6/005; G03H 1/2294; G03H 2210/30; G06F 17/142;
(Continued)

(56) References Cited

U.S. PATENT DOCUMENTS 5,301,062 A    4/1994    Takahashi et al.
6,943,788 B2    9/2005    Tomono
(Continued)

FOREIGN PATENT DOCUMENTS

KR    2003-0030365 A    4/2003
KR    10-2014-0004102 A    1/2014
(Continued)

OTHER PUBLICATIONS

Communication dated Jan. 3, 2018, from the European Patent Office in counterpart European Application No. 17157838.8.

*Primary Examiner* — Alan Cariaso
(74) *Attorney, Agent, or Firm* — Sughrue Mion, PLLC

(57) ABSTRACT

A directional backlight unit, a three-dimensional (3D) image display apparatus, and a 3D image displaying method are provided. The directional backlight unit includes a light guide plate having an emission surface on which a plurality of grating elements including first and second groups of grating elements are provided. The plurality of grating elements are arranged such that light beams emitted from the first and second groups of grating elements commonly propagate through a plurality of pixel points and respectively form first and second groups of view points of which corresponding regions do not overlap with each other.

33 Claims, 12 Drawing Sheets

(51) Int. Cl.
*H04N 13/31* (2018.01)
*H04N 13/366* (2018.01)
*G03H 1/22* (2006.01)
*G06F 17/14* (2006.01)

(52) U.S. Cl.
CPC ........... *G06F 17/142* (2013.01); *H04N 13/31* (2018.05); *H04N 13/366* (2018.05); *G03H 2210/30* (2013.01)

(58) Field of Classification Search
CPC ........... H04N 13/0409; H04N 13/0411; H04N 13/0413; H04N 13/0468
See application file for complete search history.

(56) References Cited

U.S. PATENT DOCUMENTS

| | | | |
|---|---|---|---|
| 9,436,015 B2 | 9/2016 | Woodgate et al. | |
| 2012/0092763 A1 | 4/2012 | Song | |
| 2012/0268451 A1* | 10/2012 | Tsai | G02B 27/2214 345/419 |
| 2013/0077154 A1* | 3/2013 | Popovich | G02B 27/2214 359/316 |
| 2013/0176406 A1* | 7/2013 | Ek | H04N 13/0413 348/51 |
| 2014/0044392 A1 | 2/2014 | Fattal et al. | |
| 2014/0093692 A1 | 4/2014 | Miyazawa et al. | |
| 2014/0293759 A1 | 10/2014 | Taff et al. | |
| 2014/0300840 A1 | 10/2014 | Fattal et al. | |
| 2014/0300947 A1 | 10/2014 | Fattal et al. | |
| 2014/0300960 A1 | 10/2014 | Santori et al. | |
| 2015/0036068 A1 | 2/2015 | Fattal et al. | |
| 2015/0138486 A1 | 5/2015 | Lee | |
| 2016/0033706 A1 | 2/2016 | Fattal et al. | |
| 2016/0202594 A1* | 7/2016 | Kim | H04N 13/045 348/55 |
| 2017/0052312 A1 | 2/2017 | Jung et al. | |
| 2017/0059961 A1 | 3/2017 | Park et al. | |

FOREIGN PATENT DOCUMENTS

| | | |
|---|---|---|
| KR | 10-2015-0021017 A | 2/2015 |
| KR | 10-2015-0057743 A | 5/2015 |
| WO | 2014/081415 A1 | 5/2014 |

\* cited by examiner

DIRECTIONAL BACKLIGHT UNIT, THREE-DIMENSIONAL (3D) IMAGE DISPLAY APPARATUS, AND 3D IMAGE DISPLAYING METHOD

CROSS-REFERENCE TO RELATED PATENT APPLICATION

This application claims priority from Korean Patent Application No. 10-2016-0008910, filed on Jan. 25, 2016, in the Korean Intellectual Property Office, the disclosure of which is incorporated herein by reference in its entirety.

BACKGROUND

1. Field

Exemplary embodiments relate to directional backlight units, three-dimensional (3D) image display apparatuses, and 3D image displaying methods, and more particularly, to a grating-based directional backlight unit, a 3D image display apparatus, and a 3D image displaying method.

2. Description of the Related Art

Three-dimensional (3D) image display apparatuses enable users to experience realistic and stereoscopic images. In general, 3D image display apparatuses provide a 3D effect by using a binocular parallax that appears when images at different view points are seen by the left and right eyes. In the conventional art, glasses-type 3D image displaying methods using red-green glasses, polarizing glasses, liquid crystal shutter type glasses, or the like were primarily developed. In recent years, autostereoscopic 3D image displaying methods removing the inconvenience of using glasses have been actively studied. Examples of autostereoscopic 3D image displaying methods include a method of displaying several images having different view points according to directions by using a lenticular lens, a parallax barrier, or the like; integrated image technology, which is a method of capturing images at several angles by using a plurality of cameras or lenses and displaying the images inversely; and a holography method. Among these autostereoscopic 3D image realizing technologies, a technology related with a method of constructing a 3D image by respectively transmitting light beams from pixels in desired directions by using a recent directional backlight unit is being developed.

SUMMARY

Provided are directional backlight units that provide a wide watching angle, three-dimensional (3D) image display apparatuses, and 3D image displaying methods.

Additional aspects will be set forth in part in the description which follows and, in part, will be apparent from the description, or may be learned by practice of the presented exemplary embodiments.

According to an aspect of one or more exemplary embodiments, a directional backlight unit includes a light guide plate; a light source configured to provide light to the light guide plate; and first and second groups of grating elements disposed on an emission surface of the light guide plate and configured to externally emit the light from the emission surface, wherein the first and second groups of grating elements are arranged such that light beams emitted from the first group of grating elements propagate through a plurality of pixel points spaced apart from the emission surface and form a first group of view points, that light beams emitted from the second group of grating elements propagate through the plurality of pixel points and form a second group of view points, and that a region within which the second group of view points are formed does not overlap with a region within which the first group of view points are formed. The plurality of pixel points indicate points where pixels of a spatial light modulator which will be described below are located. The plurality of pixel points may be two-dimensionally arranged on a plane or a curved surface.

The view points in the first group may be consecutively arranged, and the view points in second group may be consecutively arranged after the first group of view points.

A third group of grating elements may be further disposed on the light guide plate. In this case, the third group of grating elements is arranged such that light beams emitted from the third group of grating elements propagate through the plurality of pixel points and form a third group of view points and that a region within which the third group of view points is formed does not overlap with a region within which the first and second groups of view points are formed. For example, the view points in the third group of view points may be consecutively arranged after the second group of view points.

At least two light beams may propagate through each of the plurality of pixel points, and the at least two light beams may include a light beam emitted from one of the grating elements included in the first group and a light beam emitted from one of the grating elements included in the second group.

According to an exemplary embodiment, light beams emitted from two adjacent grating elements among the first and second groups of grating elements may be directed to different pixel points. According to another exemplary embodiment, some of the light beams emitted from two adjacent grating elements among the first and second groups of grating elements may be directed to the same pixel point.

The first and second groups of grating elements may include a plurality of patterned grooves that are substantially parallel to one another. The first and second groups of grating elements may be different from each other with respect to at least one of a grating length, a grating width, a grating depth, a grating orientation, a grating pitch, and a duty cycle. For example, the grating elements may have different grating orientations or different grating pitches so that light beams emitted from the grating elements may have different directions.

At least some of the first and second groups of grating elements may be different from each other in an arrangement interval.

Intervals between the first and second groups of grating elements and the plurality of pixel points may be substantially constant. A virtual pixel surface on which the pixel points are located, or the emission surface of the light guide plate may be a curved surface. If the virtual pixel surface on which the pixel points are located is a plane, the emission surface of the light guide plate is also a plane, and the virtual pixel surface on which the pixel points are located may be parallel to the emission surface of the light guide plate.

The number of grating elements in the first group may be substantially the same as the number of pixel points. In other words, the grating elements in the first group may match with the pixel points in a one-to-one correspondence.

The number of grating elements in the first group may be substantially the same as the number of grating elements in the second group. In this case, the number of view points in the second group formed by the second group of grating elements may be equal to the number of view points in the first group formed by the first group of grating elements. In some cases, the number of grating elements in the second group may be less than or more than the number of grating elements in the first group. When the number of grating elements in the second group is less than the number of grating elements in the first group, a resolution at the second group of view points formed by the second group of grating elements may be lower than a resolution at the first group of view points formed by the first group of grating elements.

The light guide plate may include a single light guide plate. In this case, the first and second groups of grating elements may form a single grating array on the emission surface of the light guide plate. The light guide plate may be a flat panel having a flat emission surface or a plate having a curved emission surface. The emission surface of the light guide plate and the surface on which the plurality of pixel points are located may be apart by a predetermined distance from each other. As another example, one of the emission surface of the light guide plate and the surface on which the plurality of pixel points are located may be a curved surface, and the other may be a plane, and thus an interval between the light guide plate and the spatial light modulator may be variable.

The light guide plate may include a first light guide plate and a second light guide plate that are optically separated from each other, some of the grating elements in the first and second groups may be disposed on the first light guide plate, and the others may be disposed on the second light guide plate.

The number of grating elements provided on each of the first and second light guide plates may be substantially the same as the number of pixel points. In some cases, the number of grating elements provided on the first light guide plate may be less than or more than the number of grating elements provided on the second light guide plate. The first group of grating elements may be provided on the first light guide plate and the second group of grating elements may be provided on the second light guide plate.

The first and second light guide plates may be disposed side by side in a lateral direction. The lateral direction denotes a direction toward a left side, a right side, a top side, or a bottom side of a plate. In other words, the first and second light guide plates may be arranged two-dimensionally. The first and second light guide plates may be flat panels having flat emission surfaces or curved emission surfaces. The second light guide plate may be inclined with respect to the first light guide plate. Of course, the first and second light guide plates may be arranged on a plane.

A third light guide plate may be further included, and thus the second and third light guide plates may be stacked one on another or arranged side by side, with the first light guide plate therebetween. The second and third light guide plates may be inclined with respect to the first light guide plate so that the second and third light guide plates are symmetrical about the first light guide plate. Of course, the first through third light guide plates may be arranged on a plane.

The first light guide plate may be stacked over an upper surface of the second light guide plate. The upper surface of the second light guide plate may denote an emission surface of the second light guide plate. The first and second light guide plates may be stacked without spaces therebetween or with a slight space therebetween. Since the third light guide plate is further included, the first through third light guide plates may be stacked one on another.

According to an aspect of one or more exemplary embodiments, a directional backlight unit includes a light guide plate; a light source configured to provide light to the light guide plate; and k groups of grating elements disposed on an emission surface of the light guide plate and configured to externally emit the light from the emission surface, wherein the k groups of grating elements are arranged such that light beams emitted from an l-th group of grating elements pass through a plurality of pixel points spaced apart from the emission surface and form an l-th group of view points, that light beams emitted from an m-th group of grating elements pass through the plurality of pixel points and form an m-th group of view points, and that a region where the m-th group of view points is formed does not overlap with a region where the first group of view points is formed, and wherein k may be a natural number, l may be a natural number smaller than or equal to k, and m may be a natural number smaller than l.

According to an aspect of one or more exemplary embodiments, a directional backlight unit includes a light guide plate; a light source configured to provide light to the light guide plate; and a plurality of grating elements disposed on an emission surface of the light guide plate and configured to externally emit the light from the emission surface such that the light propagates through a plurality of pixel points spaced apart from the emission surface, wherein at least two of the plurality of grating elements match with each pixel point, two adjacent grating elements match with different pixel points, and light beams emitted from the at least two grating elements pass through one pixel point matched with the at least two grating elements and then are directed toward different view points. The overall number of grating elements may be an integer multiple of the number of pixel points. The plurality of grating elements may be arranged such that light beams emitted from the plurality of grating elements pass through the plurality of pixel points and form a plurality of groups of view points and that regions where different groups of view points are formed do not overlap with each other.

According to an aspect of one or more exemplary embodiments, a three-dimensional (3D) image display apparatus includes a directional backlight unit comprising a light guide plate, a light source configured to provide light to the light guide plate, and first and second groups of grating elements disposed on an emission surface of the light guide plate and configured to externally emit the light from the emission surface; a spatial light modulator comprising a plurality of pixels that modulate light beams emitted from the directional backlight unit; and a controller configured to control the directional backlight unit and the spatial light modulator, wherein the first and second groups of grating elements are arranged such that light beams emitted from the first group of grating elements pass through the plurality of pixels of the spatial light modulator and form a first group of view points, that light beams emitted from the second group of grating elements pass through the plurality of pixels of the spatial light modulator and form a second group of view points, and that a region where the second group of view points are formed does not overlap with a region where the first group of view points are formed. The spatial light modulator may include a plurality of pixels that are two-dimensionally arranged. The spatial light modulator may be a flat panel or a curved plate. In other words, the pixels of the spatial light modulator may be located on a flat panel or a curved plate.

The view points in the first group may be consecutively arranged, and the view points in second group may be consecutively arranged after the first group of view points.

At least two light beams may pass through each of the plurality of pixel points, and the at least two light beams may include a light beam emitted from one of the grating elements included in the first group and a light beam emitted from one of the grating elements included in the second group.

3D images shown at the first group of view points may be repeatedly shown at the second group of view points.

The spatial light modulator may include a plurality of sub-pixels for each pixel, and each of the sub-pixels of the spatial light modulator may transmit light beams emitted from at least two grating elements.

Each of the sub-pixels may have a rectangular shape that is longer in one direction or a shape similar to the rectangular shape. The plurality of sub-pixels in each pixel may be arranged side by side in a width direction thereof. In a lengthwise direction of the sub-pixels, the overall number of rows of the first and second groups of grating elements may be an integer multiple of the number of rows of the sub-pixels.

The 3D image display apparatus may further include an eye tracking device configured to track eyes of a viewer. The controller may control the spatial light modulator so that pixels corresponding to the eyes of the viewer tracked by the eye tracking device generate an image. If the viewer moves from the first group of view points to the second group of view points or moves from the second group of view points to the first group of view points, a reversal between the left and right sides occurs, and a stereoscopic effect may be destroyed. Occurrence of the reversal between the left and right sides may be prevented by moving the view points in advance.

According to an aspect of one or more exemplary embodiments, a three-dimensional (3D) image display apparatus includes a directional backlight unit; a spatial light modulator including a plurality of pixels that modulate light beams emitted from the directional backlight unit; and a controller configured to control the directional backlight unit and the spatial light modulator. The directional backlight unit may include a light guide plate, a light source configured to provide light to the light guide plate, and a plurality of grating elements disposed on an emission surface of the light guide plate and configured to externally emit the light from the emission surface such that the light propagates through the plurality of pixels of the spatial light modulator. At least two of the plurality of grating elements match with each pixel, two adjacent grating elements match with different pixels, and light beams emitted from the at least two grating elements pass through one pixel matched with the at least two grating elements and then are directed toward different view points.

According to an aspect of one or more exemplary embodiments, a 3D image displaying method includes providing light to a light guide plate; arranging a plurality of grating elements comprising first and second groups of grating elements on an emission surface of the light guide plate to externally emit the light from the emission surface; modulating emitted light beams by using a plurality of pixels of a spatial light modulator; and forming a first group of view points by allowing light beams emitted from the first group of grating elements to pass through the plurality of pixels of the spatial light modulator and forming a second group of view points by allowing light beams emitted from the second group of grating elements to pass through the plurality of pixels of the spatial light modulator, wherein a region within which the second group of view points is formed does not overlap with a region within which the first group of view points is formed.

The view points in the first group may be consecutively arranged, and the view points in the second group may be consecutively arranged after the first group of view points.

At least two light beams may pass through each of the plurality of pixel points, and the at least two light beams may include a light beam emitted from one of the grating elements included in the first group and a light beam emitted from one of the grating elements included in the second group.

Light beams emitted from two adjacent grating elements among the first and second groups of grating elements may be directed to different pixels.

3D images shown at the first group of view points may be repeatedly shown at the second group of view points.

The 3D image displaying method may further include tracking eyes of a viewer. The spatial light modulator may be controlled so that pixels corresponding to the tracked eyes of the viewer generate an image.

In the provided directional backlight units, two or more grating elements correspond to each pixel, and thus light beams transmitted by one pixel are simultaneously directed toward view points in several directions while having the same information, whereby the same image may be simultaneously viewed in several directions and thus an angle for viewing a 3D image may be widened.

The provided directional backlight units may be mounted on autostereoscopic 3D display apparatuses (for example, TVs, monitors, tablets, and mobile devices).

The provided directional backlight units may widen a watching angle of a 3D display apparatus.

The provided directional backlight units may easily apply an eye tracking method to 3D display apparatuses.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
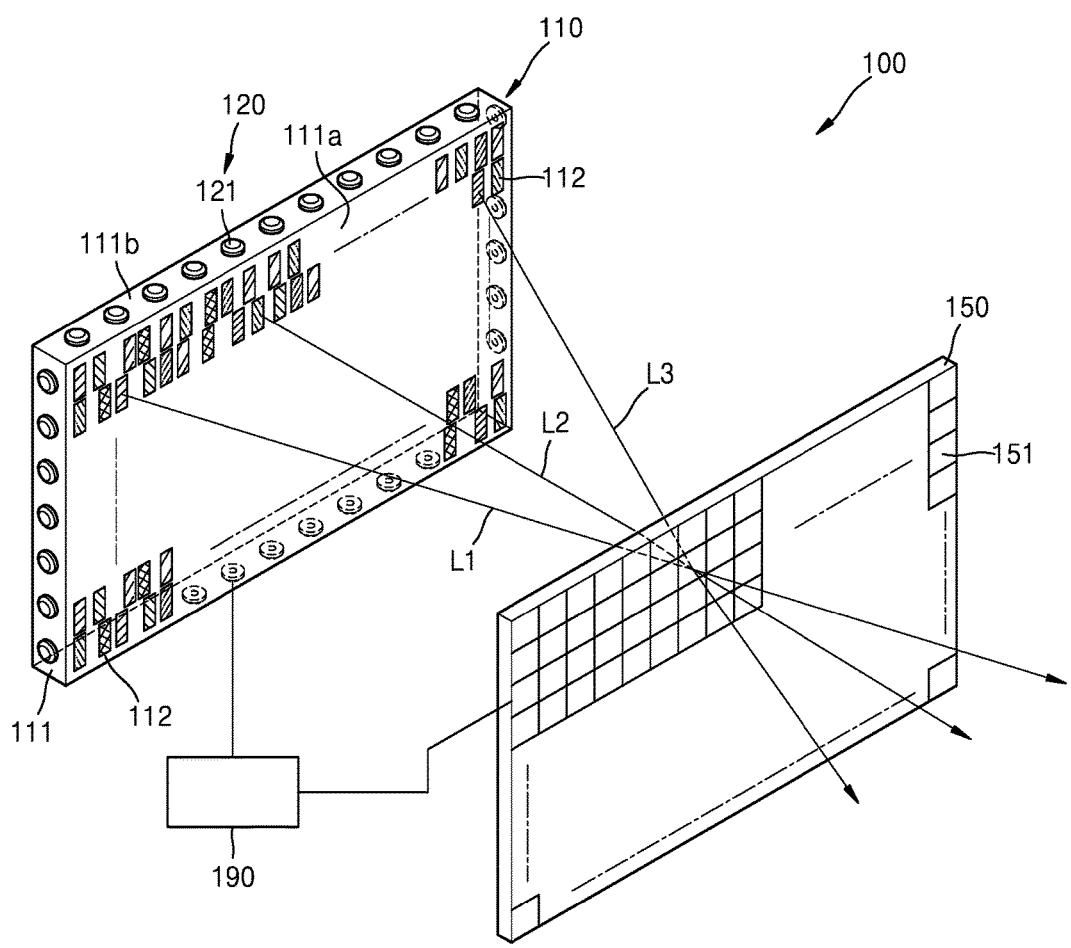
FIG. 1 is an exploded perspective view of a schematic optical construction of a 3D image display apparatus, according to an exemplary embodiment.

A directional backlight unit, a three-dimensional (3D) image display apparatus, and a 3D image displaying method will now be described in detail with reference to the accompanying drawings. Like reference numerals in the drawings denote like elements, and, in the drawings, the sizes of elements may be exaggerated for clarity and for convenience of explanation. It will be understood that when a material layer is referred to as being "formed on" a substrate or another layer, it can be directly or indirectly formed on the substrate or the other layer. That is, for example, intervening layers may be present. Materials that constitute each layer in exemplary embodiments described below are exemplary, and thus the other materials may be used.

Figure 2:
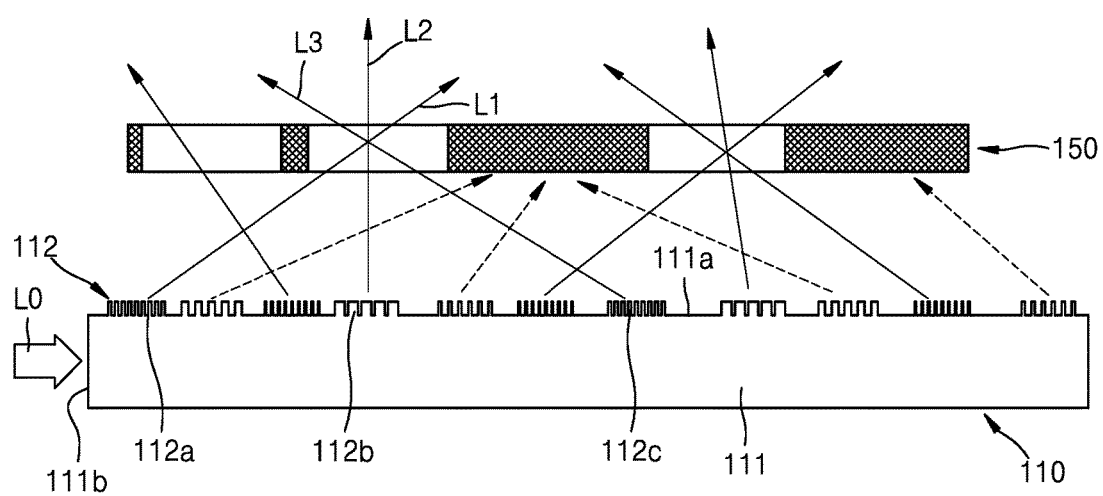
FIG. 2 schematically illustrates a positional relationship between a directional backlight unit and a spatial light modulator of the 3D image display apparatus of FIG. 1.
Figure 3:
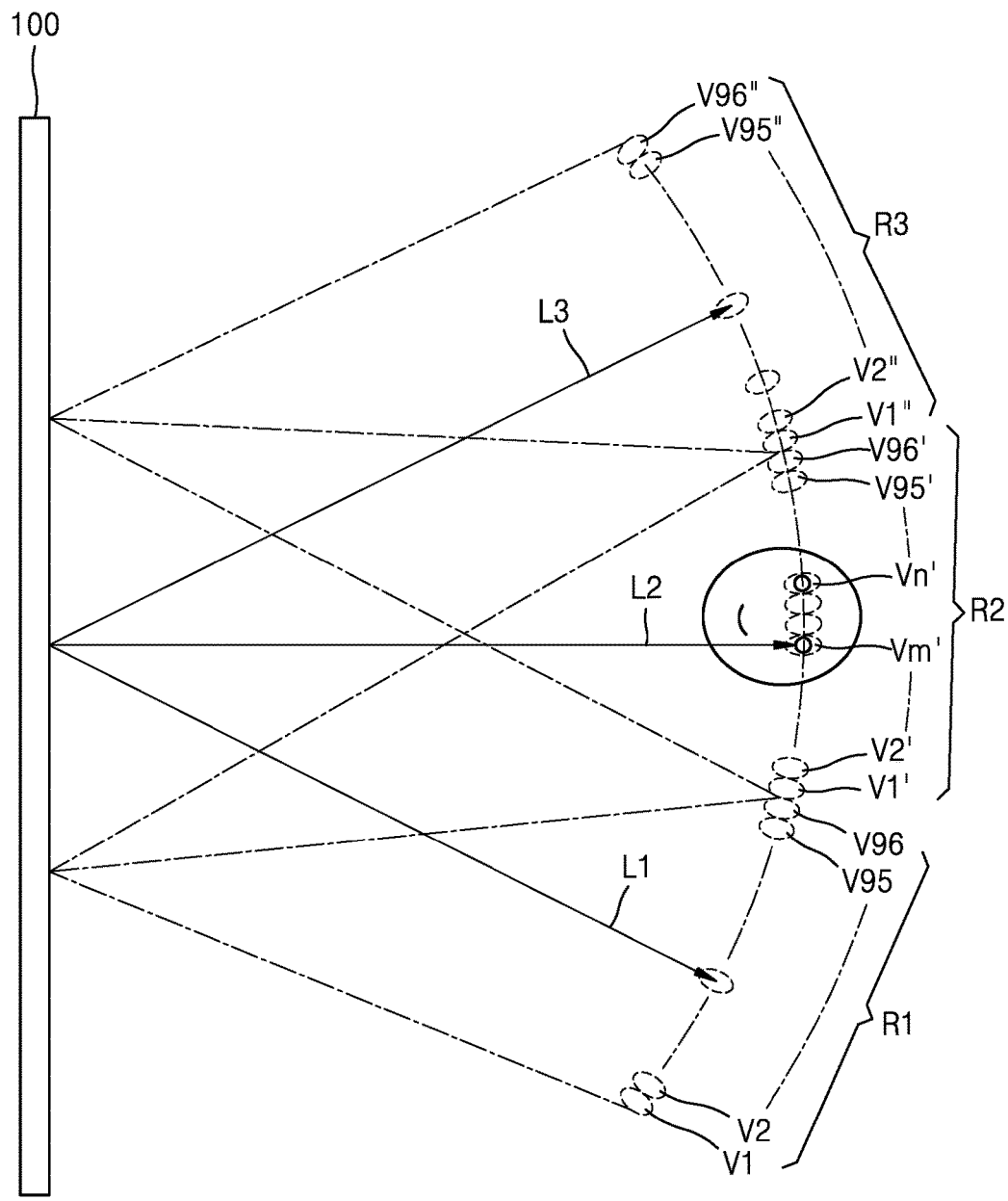
FIG. 3 schematically illustrates views that are provided by the 3D image display apparatus of FIG. 1.

FIG. 1 is an exploded perspective view of a schematic optical construction of a 3D image display apparatus 100, according to an exemplary embodiment. FIG. 2 schematically illustrates a positional relationship between a directional backlight unit 110 and a spatial light modulator 150 of the 3D image display apparatus 100 of FIG. 1. FIG. 3 schematically illustrates first, second, and third groups of view points V1, V2, . . . , V95, and V96; V1', V2', . . . , V95', and V96'; and V1", V2", . . . , V95", and V96" that are provided by the 3D image display apparatus 100 of FIG. 1.

Referring to FIGS. 1 and 2, the 3D image display apparatus 100 according to the present exemplary embodiment includes the directional backlight unit (also referred to herein as a "directional backlight device") 110, the spatial light modulator 150 including a plurality of pixels that modulate light beams emitted by the directional backlight unit 110, and a controller 190 that controls the directional backlight unit 110 and the spatial light modulator 150.

The directional backlight unit 110 includes a light guide plate 111 and a light source unit (also referred to herein as a "light source device") 120 that is configured to provide light to the light guide plate 111. A plurality of grating elements 112 that are configured to externally emit light incident upon the light guide plate 111 are formed on an emission surface 111a of the light guide plate 111.

The light source unit 120 may include a plurality of light sources 121 disposed on an edge surface 111b of the light guide plate 111. In other words, the directional backlight unit 110 according to the present exemplary embodiment may adopt an edge type method. The light sources 121 may be, for example, semiconductor light-emitting devices, such as light-emitting diodes (LEDs). The light sources 121 may be monochromatic light sources. In this case, the 3D image display apparatus 100 may display a monochrome image (for example, a black-and-white image). Alternatively, the light sources 121 may include a red light source, a green light source, and a blue light source. The red light source, the green light source, and the blue light source are driven in time series, and accordingly the spatial light modulator 150 may be driven to display a color image.

The light guide plate 111 may be a flat panel formed of a transparent material. In some cases, the light guide plate 111 may be a curved plate formed of a transparent material, or may be a flexible plate formed of a transparent material.

The plurality of grating elements 112 are two-dimensionally arranged on the emission surface 111a of the light guide plate 111. The emission surface 111a may be a wide surface of the light guide plate 111 having a flat panel shape (i.e., one of both flat panel surfaces). The grating elements 112 may be respectively formed as, for example, a plurality of patterned grooves that are substantially parallel to the emission surface 111a of the light guide plate 111. Light incident upon the light guide plate 111 is totally reflected within the light guide plate 111 and is then externally emitted via the grating elements 112. In this case, each of the grating elements 112 may be understood as a single unit grating, and thus light is emitted while being diffracted. The diffraction of light may depend on any one or more of a grating length, a grating width, a grating depth, a grating orientation, a grating pitch, a duty cycle, and the like. As will be described below, the plurality of grating elements 112 may correspond to pixels 151 of the spatial light modulator 150 in a many-to-one correspondence, and thus the grating elements 112 may be formed such that light beams emitted therefrom are diffracted in different directions. A cross-sectional shape of each of the grating elements 112 may be rectangular as shown in FIG. 2, but the exemplary embodiments are not limited thereto. As another example, a cross-section of each of the grating elements 112 may have a shape such as a triangle or a right triangle.

The spatial light modulator 150 includes a plurality of pixels 151 arranged in a two-dimensional (2D) manner. Each of the pixels 151 modulates light received via an electrical signal input. The modulation denotes blocking or transmitting light or adjusting the amount of light transmitted. Each of the pixels 151 may be rectangular, but the exemplary embodiments are not limited thereto. For example, each of the pixels 151 may have a shape, such as a rectangle having rounded corners, a parallelogram, a diamond, or a circle.

The spatial light modulator 150 may be, for example, a transmissive liquid crystal panel. The spatial light modulator 150 may have a flat panel shape. As described above, when the light guide plate 111 has a flat panel shape, an interval between the light guide plate 111 and the spatial light modulator 150 may be constant. In some cases, since the light guide plate 111 may be formed as a curved plate formed of a transparent material or as a flexible plate formed of a transparent material, the interval between the light guide plate 111 and the spatial light modulator 150 may not be constant. In addition, the spatial light modulator 150 may also be formed as a curved panel or a flexible panel. Thus, when both the light guide plate 111 and the spatial light modulator 150 are curved or flexible, the interval between the light guide plate 111 and the spatial light modulator 150 may be constant.

The plurality of grating elements 112 may correspond to the pixels 151 of the spatial light modulator 150 in a many-to-one correspondence, and thus the grating elements 112 may be grouped to form a plurality of groups. For example, the grating elements 112 may include a first group of grating elements 112a, a second group of grating elements 112b, and a third group of grating elements 112c. The grouping of the grating elements 112 into three groups, which will now be described, is only an example. According to another exemplary embodiment, the grating elements 112 may be grouped into two groups or at least four groups.

The grating elements 112a in the first group may correspond to the pixels 151 of the spatial light modulator 150 in a one-to-one correspondence, the grating elements 112b in the second group may correspond to the pixels 151 of the spatial light modulator 150 in a one-to-one correspondence, and the grating elements 112c in the third group may also correspond to the pixels 151 of the spatial light modulator 150 in a one-to-one correspondence. In other words, three grating elements may match with each of the pixels 151 of the spatial light modulator 150. The matching denotes that first light L1 emitted from one of the grating elements 112a in the first group, second light L2 emitted from one of the grating elements 112b in the second group, and third light L3 emitted from one of the grating elements 112c in the third group pass through one of the pixels 151 and are directed toward different view points. When the grating elements 112 are grouped into two groups or at least four groups according to another exemplary embodiment as described above, two or at least four grating elements may match with each of the pixels 151 of the spatial light modulator 150.

In order for the grating elements 112 to emit light beams toward the pixels of the spatial light modulator 150 in a many-to-one correspondence and for light beams transmitted by the same pixel to be directed toward different view points as described above, the grating elements 112 may be formed to be different from each other in at least one of a grating length, a grating width, a grating depth, a grating orientation, a grating pitch, and a duty cycle. For example, the grating elements 112 may have different grating orientations or different grating pitches so that light beams emitted from the grating elements 112 may have different diffraction directions. When the grating elements 112 are formed as grooves, a grating length may denote a groove length, a grating width may denote a groove width, a grating depth may denote a groove depth, a grating orientation may denote a width direction (or a length direction) of a groove, a grating pitch may denote an interval between grooves, and a duty cycle may denote a ratio between the groove length and the interval between grooves. Since the plurality of view points may be arranged to be connected to one another in a horizontal direction as will be described below, a grating element 112a in the first group, a grating element 112b in the second group, and a grating element 112c in the third group corresponding to one pixel may be arranged in a horizontal direction. At least some of the grating elements 112 may have different arrangement intervals. The arrangement interval denotes a spatial interval between grating elements 112. Grating elements 112 corresponding to one pixel may have grating elements 112 corresponding to another pixel therebetween. In some cases, the grating elements 112 corresponding to one pixel may be arranged consecutively.

An operation of the 3D image display apparatus 100 according to the present exemplary embodiment will presently be described.

The controller 190 controls the light source unit 120 to provide light to the light guide plate 111.

As described above, since the first group of grating elements 112a is formed on the emission surface 111a of the light guide plate 111, the grating elements 112a in the first group on the light guide plate 111 emit first light beams L1 toward corresponding pixels 151 of the spatial light modulator 150. The first light beams L1 transmitted by the pixels 151 of the spatial light modulator 150 form a first group of view points V1, V2, . . . , V95, and V96 (see FIG. 3). Although 96 view points V1, V2, . . . , V95, and V96 are formed the first group in FIG. 3, this is only an example, and less or more view points than the 96 view points may be formed.

The grating elements 112b in the second group on the light guide plate 111 emit second light beams L2, and the second light beams L2 propagate through corresponding pixels 151 of the spatial light modulator 150 and then form a second group of view points V1', V2', . . . , V95', and V96' (see FIG. 3). The grating elements 112c in the third group on the light guide plate 111 emit third light beams L3, and the third light beams L3 propagate through corresponding pixels 151 of the spatial light modulator 150 and then form a third group of view points V1", V2", . . . , V95", and V96" (see FIG. 3). At this time, a first region R1, in which the first group of view points V1, V2, . . . , V95, and V96 are formed, a second region R2, in which the second group of view points V1', V2', . . . , V95', and V96' are formed, and a third region R3, in which the third group of view points V1", V2", . . . , V95", and V96" are formed, do not overlap with one another. As shown in FIG. 3, the second group of view points V1', V2', . . . , V95', and V96' may be arranged after the first group of view points V1, V2, . . . , V95, and V96, and the third group of view points V1", V2", . . . , V95", and V96" may be arranged after the second group of view points V1', V2', . . . , V95', and V96'.

As shown in FIG. 3, the first, second, and third groups of view points V1, V2, . . . , V95, and V96; V1', V2', . . . , V95', and V96'; and V1", V2", . . . , V95", and V96" may be consecutively arranged in a circumferential direction at intervals of a distance that is less than or equal to an average binocular distance of a viewer (e.g., 6.1 cm), at a predetermined watching distance. For example, intervals between the first group of view points V1, V2, . . . , V95, and V96 may each be approximately equal to a pupil size of the viewer.

The controller 190 controls the spatial light modulator 150 to modulate the first, second, and third light beams L1, L2, and L3, thereby enabling an image to be viewed at the first, second, and third groups of view points V1, V2, . . . , V95, and V96; V1', V2', . . . , V95', and V96'; and V1", V2", . . . , V95", and V96". Images that are viewed at each of the first, second, and third groups of view points V1, V2, . . . , V95, and V96; V1', V2', . . . , V95', and V96'; and V1", V2", . . . , V95", and V96" are two-dimensional (2D) images. For example, when the directional backlight unit 110 forms 96 view points for each group, as shown in FIG. 3, a 2D image viewed at one view point corresponding to one eye of the viewer (e.g., the view point V1) may be generated by 1/96 of the pixels 151. The number of pixels contributing to 2D image generation for each view point is exemplary, and may vary based on image generating methods. When the spatial light modulator 150 displays a 3D image, the 2D images viewed at the first group of view points V1, V2, . . . , V95, and V96 are formed to have a binocular parallax between view points spaced apart at an interval corresponding to the binocular distance of the viewer, thereby enabling the viewer to experience a stereoscopic effect via both eyes. For example, in FIG. 3, a view point Vm' and a view point Vn' are spaced apart from each other by an average binocular distance of the viewer, and an image viewed at the view point Vm' and an image viewed at the view point Vn' may have a binocular parallax. When the spatial light modulator 150 displays a 2D image, the spatial light modulator 150 modulates the first light beams L1 so that these 2D images are the same images and thus do not have a binocular parallax. Since images formed at the second group of view points V1', V2', . . . , V95', and V96' or the third group of view points V1", V2', . . . , V95", and V96" have passed through pixels 151 of the spatial light modulator 150 that form images of the first group of view points V1, V2, . . . , V95, and V96, the images formed at the second group of view points V1', V2', . . . , V95', and V96' or the third group of view points V1", V2', . . . , V95", and V96" are the same as the images of the first group of view points V1, V2, . . . , V95, and V96. In other words, the 3D images of a binocular parallax shown at the first group of view points V1, V2, . . . , V95, and V96 may be repeatedly shown at the second group of view points V1', V2', . . . , V95', and V96' or the third group of view points V1", V2", . . . , V95", and V96".

FIGS. 4A, 4B, 4C, and 4D schematically illustrate a difference between view points according to an exemplary embodiment and view points according to comparative examples. Table 1 below shows the characteristics of 3D images according to the present exemplary embodiment and the comparative examples.

TABLE 1

|  | Watching degree (deg) | Number of view points | Interval between view points (@ 0.5 m) (mm) | 3D resolution | Stereoscopic effect |
|---|---|---|---|---|---|
| Comparative Example 1 | 40° | 96 | 6.1 | | |
| Comparative Example 2 | 80° | 96 | 12.2 | | Degraded |
| Comparative Example 3 | 80° | 192 | 6.1 | Degraded | |
| Exemplary Embodiment 1 | 80° | 96 | 6.1 | | |

Figure 4A:
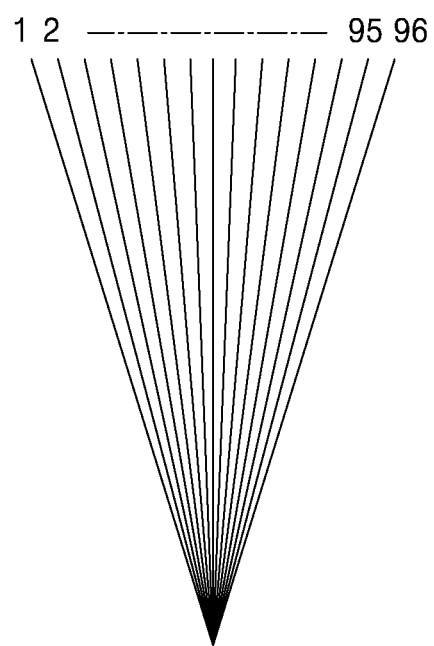
FIGS. 4A, 4B, 4C, and 4D schematically illustrate a difference between view points according to an exemplary embodiment and view points according to comparative examples.

FIG. 4A illustrates a case in which a 3D display apparatus forms 96 view points, and the case of FIG. 4A corresponds to Comparative Example 1 in Table 1. The 96 view points are arranged at intervals of 6.1 mm at a watching distance of 0.5 m. In this case, a watching angle (i.e., a viewing angle at which a viewer views a 3D image) is restricted to a region that forms the 96 view points, for example, to 40°.

Figure 4B:
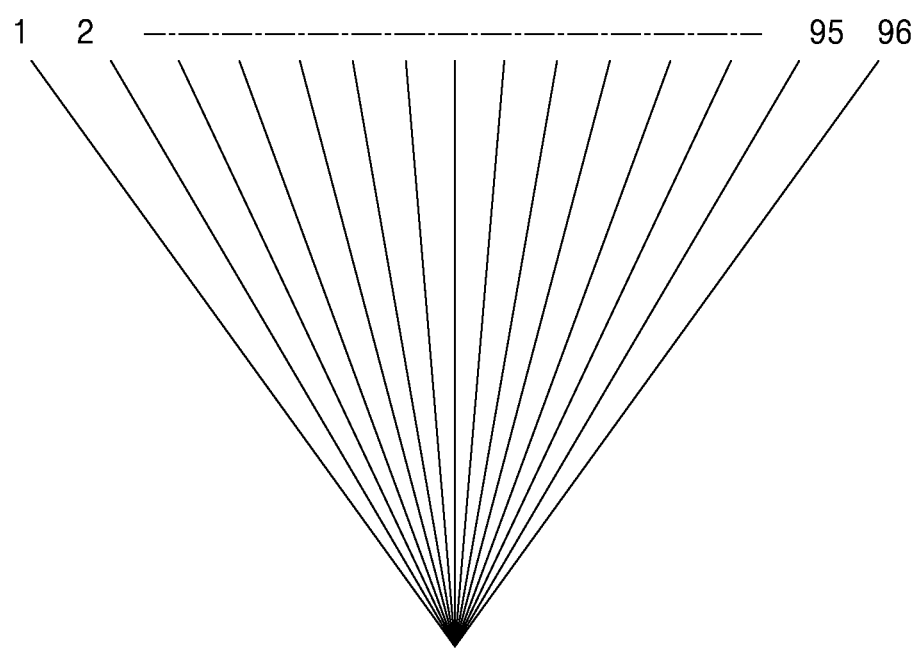

FIG. 4B illustrates a case in which a 3D display apparatus forms 96 view points and widens an interval between the 96 view points to 12.2 mm at the viewing distance of 0.5 m in order to increase the watching angle at which a viewer is able to view a 3D image. The case of FIG. 4B corresponds to Comparative Example 2 in Table 1. In this case, as the interval between the 96 view points is doubled, when the viewer moves, the degree of a variation of an image becomes relatively slow according to a time difference corresponding to the movement amount, and thus a 3D effect is degraded.

Figure 4C:
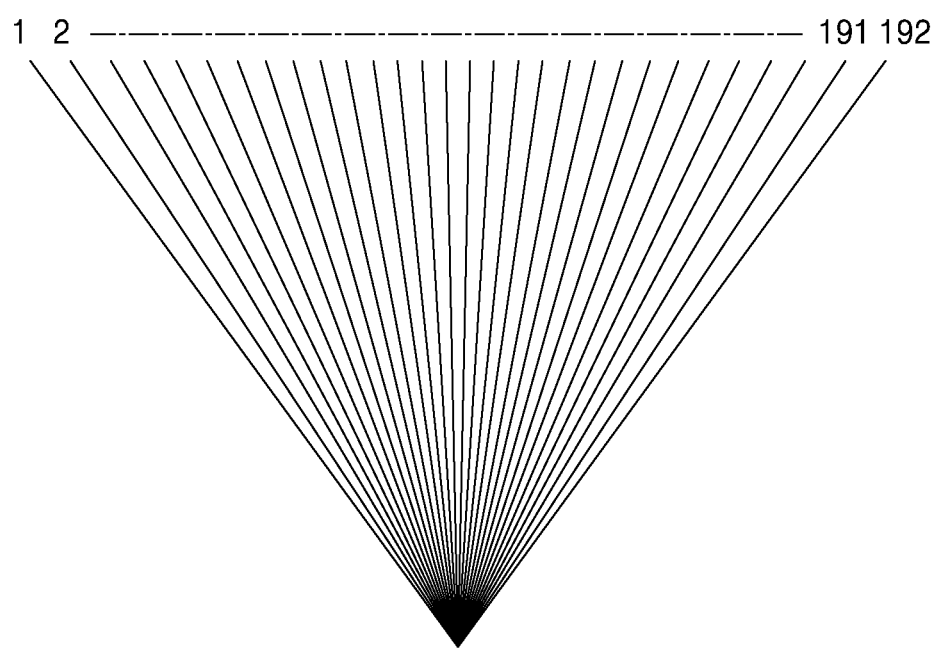

FIG. 4C illustrates a case in which a 3D display apparatus forms 192 view points, and the case of FIG. 4C corresponds to Comparative Example 3 in Table 1. In this case, an interval between the 192 view points maintains the interval between the 96 view points in FIG. 4A, but the resolution of an image viewed at each view point is halved. The resolution of an image viewed at each view point in the comparative examples is a result of splitting the overall resolution of a spatial light modulator by the number of view points. However, when the number of view points is increased as in Comparative Example 3, a resolution at each view point is decreased, and consequently a 3D resolution is degraded.

Figure 4D:
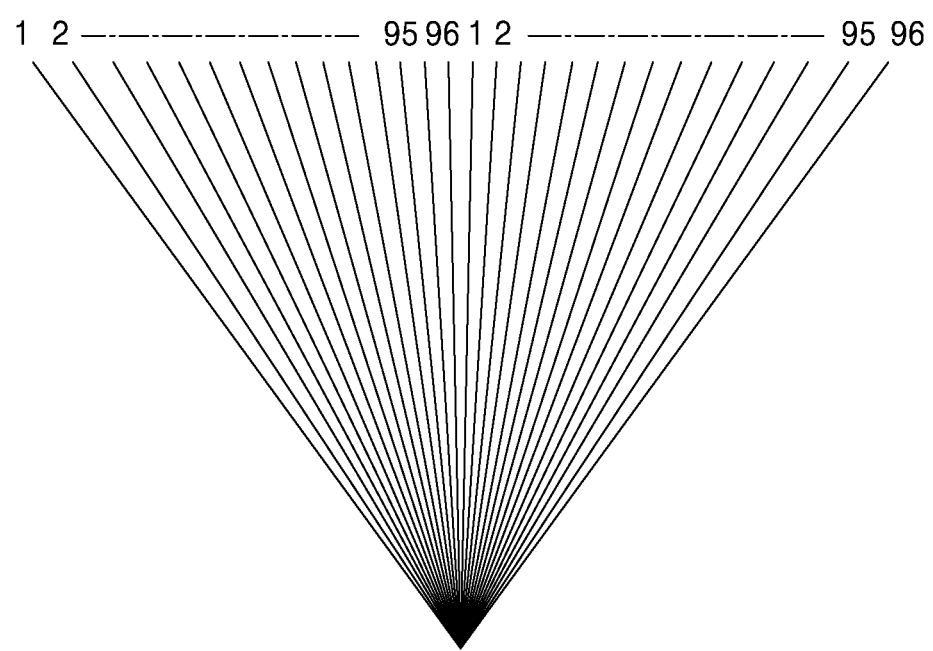

FIG. 4D illustrates a case in which a 3D display apparatus repeats the 96 view points to form two groups, and the case of FIG. 4D corresponds to Exemplary Embodiment 1 in Table 1. Exemplary Embodiment 1 is a case in which two groups of grating elements are provided on a light guide plate of a directional backlight unit such that two grating elements match with each pixel of a spatial light modulator and in which the grating elements in each of the two groups form 96 view points. In this case, an inter-view interval maintains the interval between the view points in FIG. 4A, and the overall number of view points is 192 and thus a wide watching angle is secured. Moreover, since two groups of view points are repeated, the resolution of an image viewed at each view point is a result of splitting the overall resolution of the spatial light modulator by the number of view points included in each group. Thus, a phenomenon in which a 3D resolution is degraded instead of increasing a watching angle as in Comparative Example 3 does not occur, and a 3D effect is not degraded since the inter-view interval is not increased.

Although a case in which the first, second, and third groups of view points V1, V2, . . . , V95, and V96; V1', V2', . . . , V95', and V96'; and V1", V2", . . . , V95", and V96" are repeated and arranged in a circumferential direction is illustrated in the above-described exemplary embodiments, the exemplary embodiments are not limited thereto. For example, the first, second, and third groups of grating elements 112a, 112b, and 112c may be formed such that the second group of view points V1', V2', . . . , V95', and V96' or the third group of view points V1", V2", . . . , V95", and V96" may be positioned in a vertical direction of the first group of view points V1, V2, . . . , V95, and V96.

Figure 5:
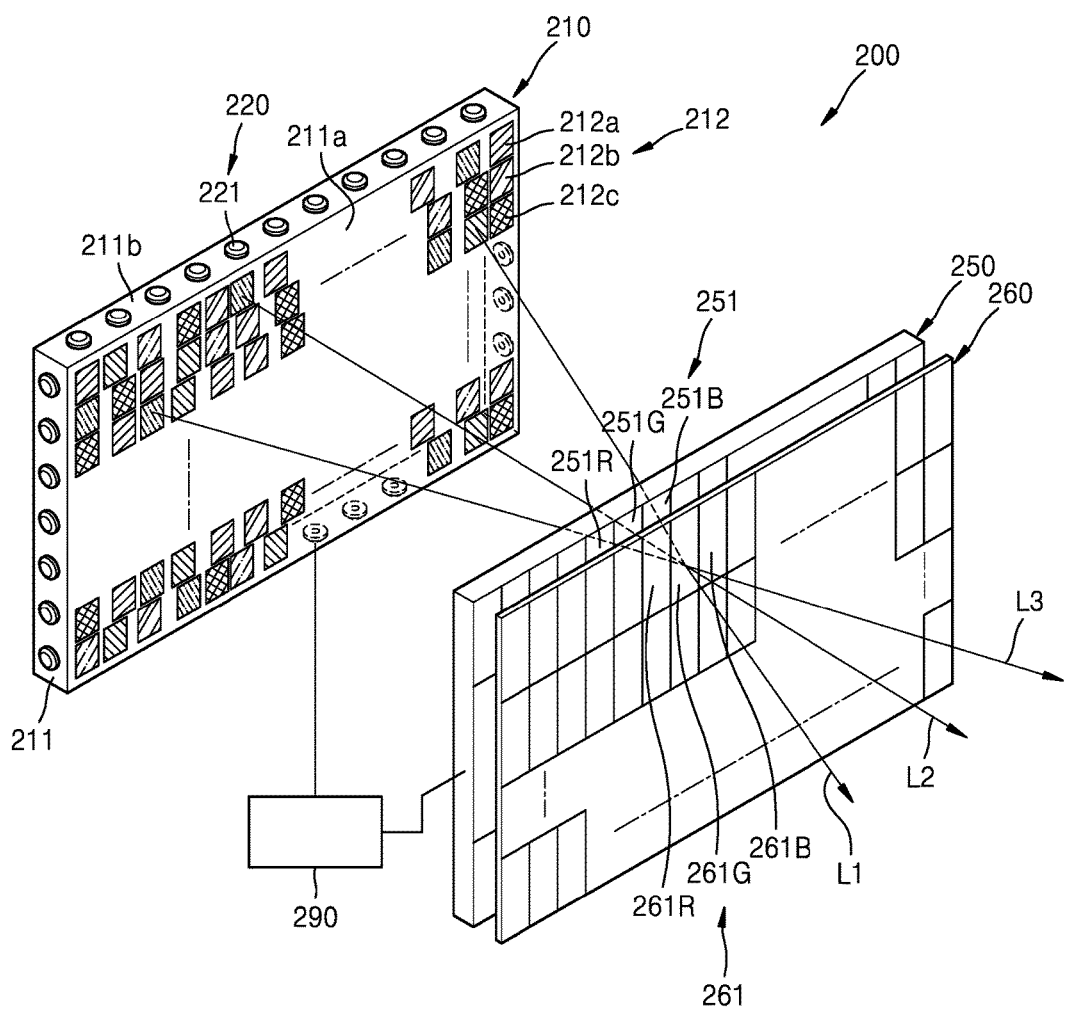
FIG. 5 is an exploded perspective view of a schematic optical construction of a 3D image display apparatus, according to an exemplary embodiment.

FIG. 5 is an exploded perspective view of a schematic optical construction of a 3D image display apparatus 200, according to another exemplary embodiment.

Referring to FIG. 5, the 3D image display apparatus 200 according to the present exemplary embodiment includes a directional backlight unit (also referred to herein as a "directional backlight device") 210, a spatial light modulator 250, a color filter 260, and a controller 290 that is configured to control the directional backlight unit 210 and the spatial light modulator 250. The 3D image display apparatus 200 according to the present exemplary embodiment is substantially the same as the 3D image display apparatus 100 according to the previous exemplary embodiment except that the color filter 260 is further included, and thus this difference will be described in detail below.

The directional backlight unit 210 includes a light guide plate 211 and a light source unit (also referred to herein as a "light source device") 220 that is configured to provide light to the light guide plate 211. A plurality of grating elements 212 externally emitting light incident upon the light guide plate 211 are formed on an emission surface 211a of the light guide plate 211. The light source unit 220 may include a plurality of red, green, and blue light sources 221 disposed on an edge surface 211b of the light guide plate 211.

The spatial light modulator 250 includes a plurality of sub-pixels 251 arranged in a 2D manner. The sub-pixels 251 may include red sub-pixels 251R, green sub-pixels 251G, and blue sub-pixels 251B. A red sub-pixel 251R, a green sub-pixel 251G, and a blue sub-pixel 251B are arranged side by side in a width direction thereof and thus form a pixel. Each of the sub-pixels 251 may have a rectangular shape that is longer in one direction. The color filter 260 may include pixel filters 261 including red pixel filters 261R, green pixel filters 261G, and blue pixel filters 261B such that the pixel filters correspond to the red sub-pixels 251R, the green sub-pixels 251G, and the blue sub-pixels 251B in a one-to-one correspondence. The red, green, and blue sub-pixels 251R, 251G, and 251B may modulate light, and the red, green, and blue pixel filters 261R, 261G, and 261B may transmit red, green, and blue light beams, respectively, and may block light from sub-pixels of different colors from the sub-pixels corresponding to the red, green, and blue pixel filters 261R, 261G, and 261B due to dispersion of light, to thereby reduce the number of unwanted signals. In FIG. 5, the spatial light modulator 250 and the color filter 260 are spaced apart from each other. However, this is for convenience of explanation, and the spatial light modulator 250 and the color filter 260 may be disposed close to each other to form a single display panel. A case where the sub-pixels 251 form a single pixel by using red, green, and blue sub-pixels and each of the sub-pixels 251 has a rectangular shape will now be described, but the exemplary embodiments are not limited thereto. According to another exemplary embodiment, the color combination of the sub-pixels 251 to form a single pixel may be varied, and the shape of each of the sub-pixels 251 or the arrangement of the sub-pixels 251 may be varied. For example, each of the sub-pixels 251 may have a shape, such as a rectangle having rounded corners, a parallelogram, a diamond, or a circle, and the sub-pixels 251 may have a slightly-inclined arrangement or a zigzag arrangement.

The plurality of grating elements 212 may correspond to the sub-pixels 251 of the spatial light modulator 250 in a many-to-one correspondence, and thus the grating elements 212 may be grouped to form a plurality of groups. For example, the grating elements 212 may be grouped into, for example, three groups. In other words, the grating elements 212 may include a first group of grating elements 212a, a second group of grating elements 212b, and a third group of grating elements 212c. The grating elements 212a in the first group may correspond to the sub-pixels 251 of the spatial light modulator 250 in a one-to-one correspondence, the grating elements 212b in the second group may correspond to the sub-pixels 251 of the spatial light modulator 250 in a one-to-one correspondence, and the grating elements 212c in the third group may also correspond to the sub-pixels 251 of the spatial light modulator 250 in a one-to-one correspondence. Since each of the sub-pixels 251 may have a rectangular shape that is longer in one direction as described above, three rows of the first, second, and third groups of grating elements 212a, 212b, and 212c may correspond to one row of sub-pixels 251 in the width direction of the sub-pixels 251. In other words, grating elements 212 corresponding to one sub-pixel 251 may be understood as three parts into which the sub-pixel 251 is split in a length direction thereof (in the vertical direction in FIG. 5). Based on the length direction of the sub-pixels 251, the overall number of rows of the grating elements 212 may be equal to an integer multiple of the number of rows of the sub-pixels 251. Grating shapes or arrangement intervals of the grating elements 212 may be different from one another so that light beams are emitted from the grating elements 212, propagate through corresponding sub-pixels 251, and then form different view points.

The grouping of the grating elements 212 into three groups in the above description is only an example. According to another exemplary embodiment, the grating elements 212 may be grouped into two groups or at least four groups.

In the above-described exemplary embodiments, the 3D image display apparatuses 100 and 200 include the edge-type directional backlight units 110 and 210, respectively, that is, the light source units 120 and 220 are positioned on respective edge surfaces of the light guide plates 111 and 211. However, the exemplary embodiments are not limited thereto.

Figure 6:
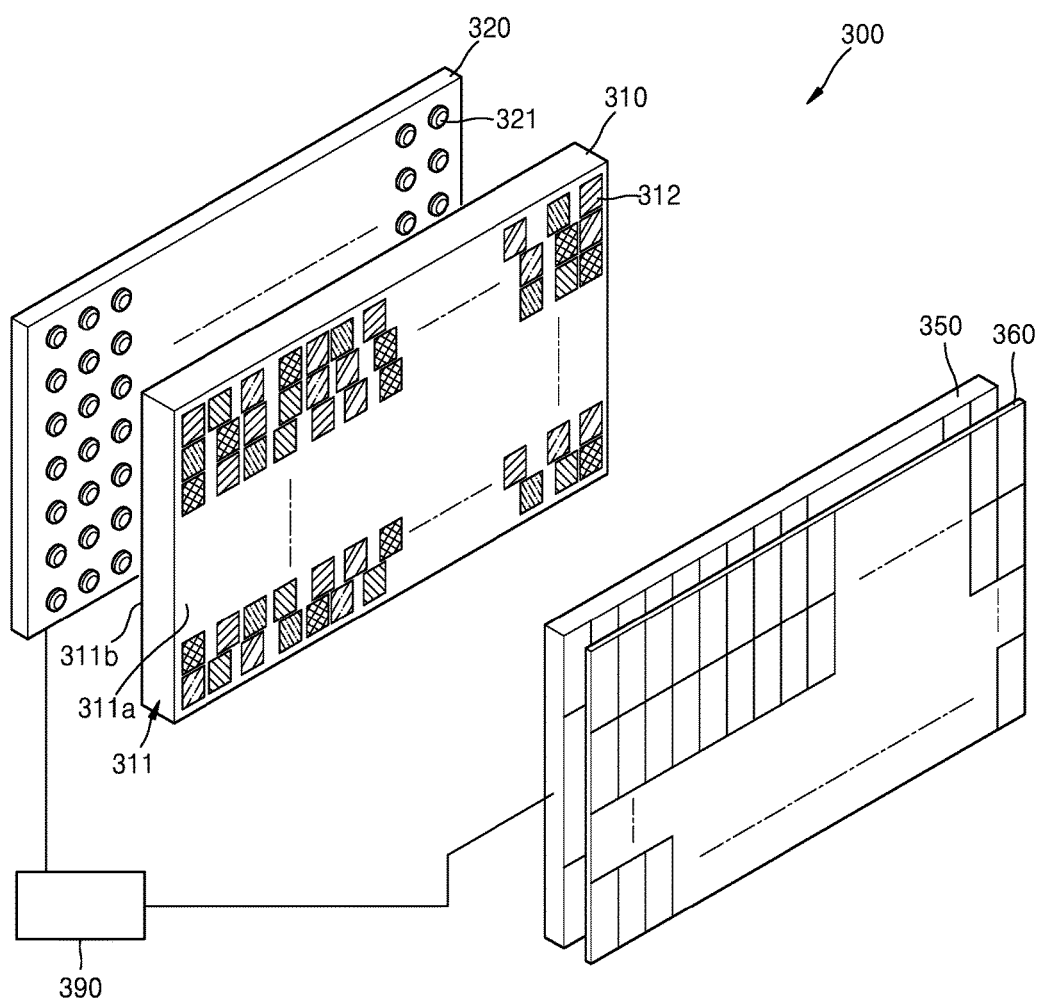
FIG. 6 is an exploded perspective view of a 3D image display apparatus, according to another exemplary embodiment.

FIG. 6 is an exploded perspective view of a 3D image display apparatus 300 according to another exemplary embodiment. Referring to FIG. 6, the 3D image display apparatus 300 according to the present exemplary embodiment includes a directional backlight unit 310, a spatial light modulator 350, a color filter 360, and a controller 390 that is configured to control the directional backlight unit 310 and the spatial light modulator 350. The directional backlight unit 310 includes a plurality of grating elements 312 on a front surface 311a of a light guide plate 311, and a light source unit 320 is disposed on a rear surface 311b of the light guide plate 311. For example, the light source unit 320 may include a plurality of light sources 321 arranged in a 2D manner. The light sources 321 may be red, green, and blue light sources. As another example, the light sources 321 of the light source unit 320 maybe white light sources, and a color may be realized via the color filter 360. The plurality of grating elements 312, arranged on the front surface 311a of the light guide plate 311, the spatial light modulator 350, and the color filter 360 are substantially the same as those in the previously described exemplary embodiments, and thus detailed descriptions thereof will be omitted here.

In the above-described exemplary embodiments, the 3D image display apparatuses 100, 200, and 300 include the directional backlight units 110, 210, and 310 respectively including the single light guide plate 111, the single light guide plate 211, and single light guide plate 311. However, the exemplary embodiments are not limited thereto.

Figure 7:
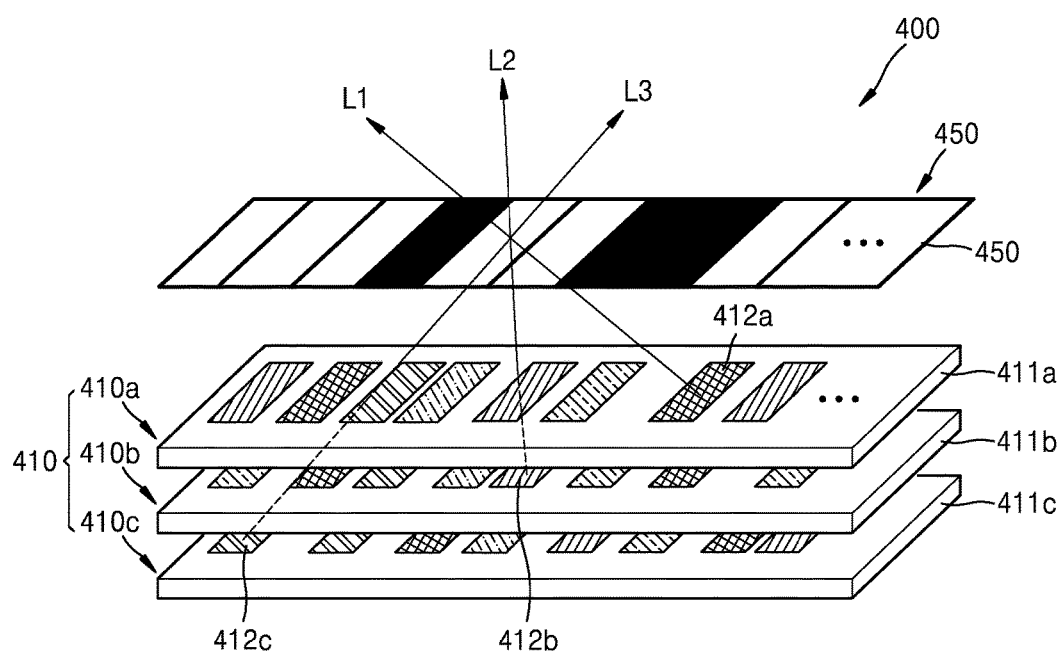
FIG. 7 is an exploded perspective view of a schematic optical construction of a 3D image display apparatus, according to another exemplary embodiment.

FIG. 7 is an exploded perspective view of a 3D image display apparatus 400 according to another exemplary embodiment. Referring to FIG. 7, the 3D image display apparatus 400 according to the present exemplary embodiment includes a directional backlight unit 410, a spatial light modulator 450, and a controller (not shown) configured to control the directional backlight unit 410 and the spatial light modulator 450.

The directional backlight unit 410 may include first, second, and third backlight units 410a, 410b, and 410c which are optically separated from one another. The first, second, and third backlight units 410a, 410b, and 410c may include first, second, and third light guide plates 411a, 411b, and 411c, respectively. The first, second, and third light guide plates 411a, 411b, and 411c may be stacked one on another. In detail, the first light guide plate 411a may be staked over an upper surface of the second light guide plate 411b, and the second light guide plate 411b may be stacked over an upper surface of the third light guide plate 411c. The upper surfaces of the second and third light guide plates 411b and 411c may denote emission surfaces of the second and third light guide plates 411b and 411c. The first, second, and third light guide plates 411a, 411b, and 411c may be stacked one on another without having spaces therebetween or may be stacked one on another with spaces therebetween. The first, second, and third light guide plates 411a, 411b, and 411c may be stacked one on another slightly in a zigzag manner. A light source unit (not shown) may be disposed on edge surfaces of the first, second, and third light guide plates 411a, 411b, and 411c.

First, second, and third grating elements 412a, 412b, and 412c may be provided on the respective emission surfaces of the first, second, and third light guide plates 411a, 411b, and 411c, respectively. The first, second, and third grating elements 412a, 412b, and 412c may correspond to pixels 451 of the spatial light modulator 450 in a many-to-one correspondence, and accordingly, the first, second, and third grating elements 412a, 412b, and 412c may be grouped into, for example, first, second, and third groups. The grating elements 412a in the first group may correspond to the pixels 451 of the spatial light modulator 450 in a one-to-one correspondence, the grating elements 412b in the second group may correspond to the pixels 451 of the spatial light modulator 450 in a one-to-one correspondence, and the grating elements 412c in the third group may also correspond to the pixels 450 of the spatial light modulator 450 in a one-to-one correspondence. In detail, first light L1 emitted from one of the grating elements 412a in the first group directly passes through one of the pixels 451. Second light L2 emitted from one of the grating elements 412b in the second group passes through one of the pixels 451 via the first light guide plate 411a. At this time, the second light L2 may pass through first grating elements 412a provided on the first light guide plate 411a or may be blocked thereby. Even if the second light L2 passes through the first grating elements 412a provided on the first light guide plate 411a, an optical intensity of high-level diffracted light becomes very weak, and thus an image viewed by a viewer may not be greatly degraded. Third light L3 emitted from one of the grating elements 412c in the third group passes through one of the pixels 451 via the second light guide plate 411b and the first light guide plate 411a. At this time, the third light L3 may pass through second grating elements 412b provided on the second light guide plate 411b or first grating elements 412a provided on the first light guide plate 411a or may be blocked thereby. The first, second, and third lights L1, L2, and L3 respectively emitted by the first, second, and third grating elements 412a, 412b, and 412c pass through the same pixel and then are directed toward different view points.

According to the present exemplary embodiment, the first, second, and third backlight units 410a, 410b, and 410c may be independently driven. Since the first backlight unit 410a emit first lights L1 heading for a first group of view points, if a viewer exists within a region of the first group of view points, only the first backlight unit 410a may be driven. A 3D image display apparatus employing an eye tracking device as in an exemplary embodiment, which will be described below, may detect a user's eyes and drive only a backlight unit including views that correspond to the detected user's eyes.

Although the first, second, and third grating elements 412a, 412b, and 412c are provided on the respective emission surfaces of the first, second, and third light guide plates 411a, 411b, and 411c in the present exemplary embodiment, the exemplary embodiments are not limited thereto. For example, the first grating elements 412a may be scattered and provided on the respective emission surfaces of the first, second, and third light guide plates 411a, 411b, and 411c, and the second and third grating elements 412b and 412c may also be scattered and provided on the respective emission surfaces of the first, second, and third light guide plates 411a, 411b, and 411c.

Although the directional backlight unit 410 is a stack of three light guide plates in the present exemplary embodiment, the directional backlight unit 410 may be a stack of two or at least four light guide plates.

Figure 8:
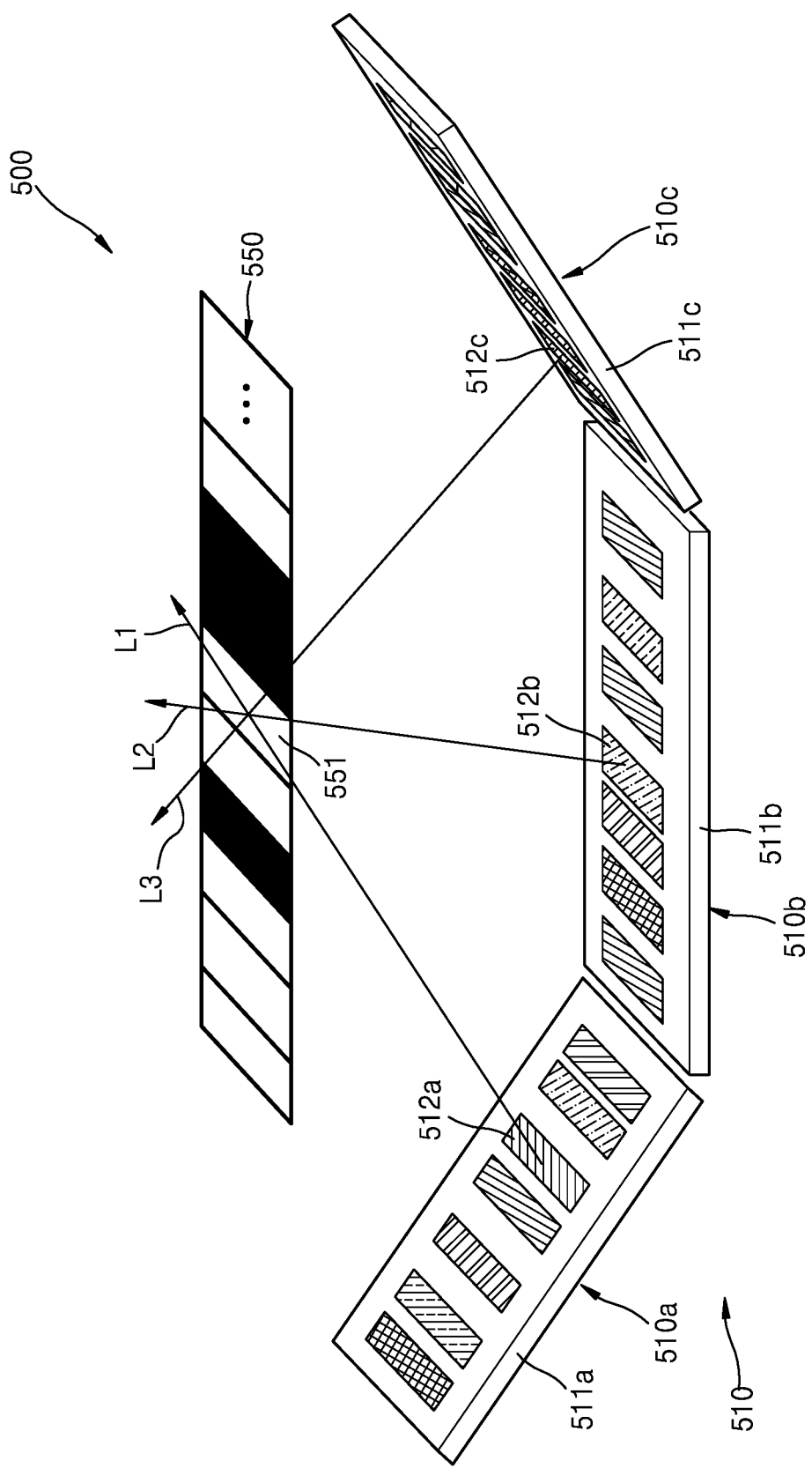
FIG. 8 is an exploded perspective view of a schematic optical construction of a 3D image display apparatus, according to another exemplary embodiment.

FIG. 8 is an exploded perspective view of a 3D image display apparatus 500 according to another exemplary embodiment. Referring to FIG. 8, the 3D image display apparatus 500 according to the present exemplary embodiment includes a directional backlight unit 510, a spatial light modulator 550, and a controller (not shown) configured to control the directional backlight unit 510 and the spatial light modulator 550.

The directional backlight unit 510 may include first, second, and third backlight units 510a, 510b, and 510c. The first, second, and third backlight units 510a, 510b, and 510c may include first, second, and third light guide plates 511a, 511b, and 511c, respectively. The first, second, and third light guide plates 511a, 511b, and 511c may be arranged side by side in a horizontal direction. In detail, the second light guide plate 511b may be disposed to be separated from a rear surface of the spatial light modulator 550, the first light guide plate 511a may be disposed on the left side of the second light guide plate 511b to be slightly inclined with respect to the spatial light modulator 550, and the third light guide plate 511c may be disposed on the right side of the second light guide plate 511b to be slightly inclined with respect to the spatial light modulator 550. A light source unit (not shown) may be disposed on edge surfaces or rear surfaces of the first, second, and third light guide plates 511a, 511b, and 511c.

First, second, and third grating elements 512a, 512b, and 512c may be provided on the respective emission surfaces of the first through third light guide plates 511a, 511b, and 511c, respectively. The first, second, and third grating elements 512a, 512b, and 512c may correspond to pixels 551 of the spatial light modulator 550 in a three-to-one correspondence and thus may be grouped into three groups. The grating elements 512a in the first group may correspond to the pixels 551 of the spatial light modulator 550 in a one-to-one correspondence, the grating elements 512b in the second group may correspond to the pixels 551 of the spatial light modulator 550 in a one-to-one correspondence, and the grating elements 512c in the third group may also correspond to the pixels 551 of the spatial light modulator 550 in a one-to-one correspondence. The respective numbers of first, second, and third grating elements 512a, 512b, and 512c provided on the first, second, and third light guide plates 511a, 511b, and 511c may be substantially the same as the number of pixels 551 of the spatial light modulator 550. Although the first, second, and third grating elements 512a, 512b, and 512c are provided on the respective emission surfaces of the first, second, and third light guide plates 511a, 511b, and 511c in the present exemplary embodiment, the exemplary embodiments are not limited thereto. For example, the first grating elements 512a may be scattered and provided on the respective emission surfaces of the first, second, and third light guide plates 511a, 511b, and 511c, and the second and third grating elements 512b and 512c may also be scattered and provided on the respective emission surfaces of the first, second, and third light guide plates 511a, 511b, and 511c. The respective numbers of first, second, and third grating elements 512a, 512b, and 512c respectively provided on the first, second, and third light guide plates 511a, 511b, and 511c may be different from one another.

Although the directional backlight unit 510 is a side-by-side arrangement of three light guide plates in the present exemplary embodiment, the directional backlight unit 510 may be a side-by-side arrangement of two or at least four light guide plates. The directional backlight unit 510 may also be a stack of light guide plates as in the embodiment of FIG. 7, instead of a side-by-side arrangement of light guide plates.

Although the first and third light guide plate 511a and 511c are slightly inclined with respect to the second light guide plate 511b in the present exemplary embodiment, the exemplary embodiments are not limited thereto. For example, the first, second, and third light guide plates 511a, 511b, and 511c may be disposed on a plane. As another example, the first, second, and third light guide plates 511a, 511b, and 511c may be disposed on a curved surface.

Although the first and third light guide plate 511a and 511c are juxtaposed in a horizontal direction in the present exemplary embodiment, the exemplary embodiments are not limited thereto. For example, the first and third light guide plates 511a and 511c may be respectively disposed over and below the second light guide plate 511b.

Figure 9:
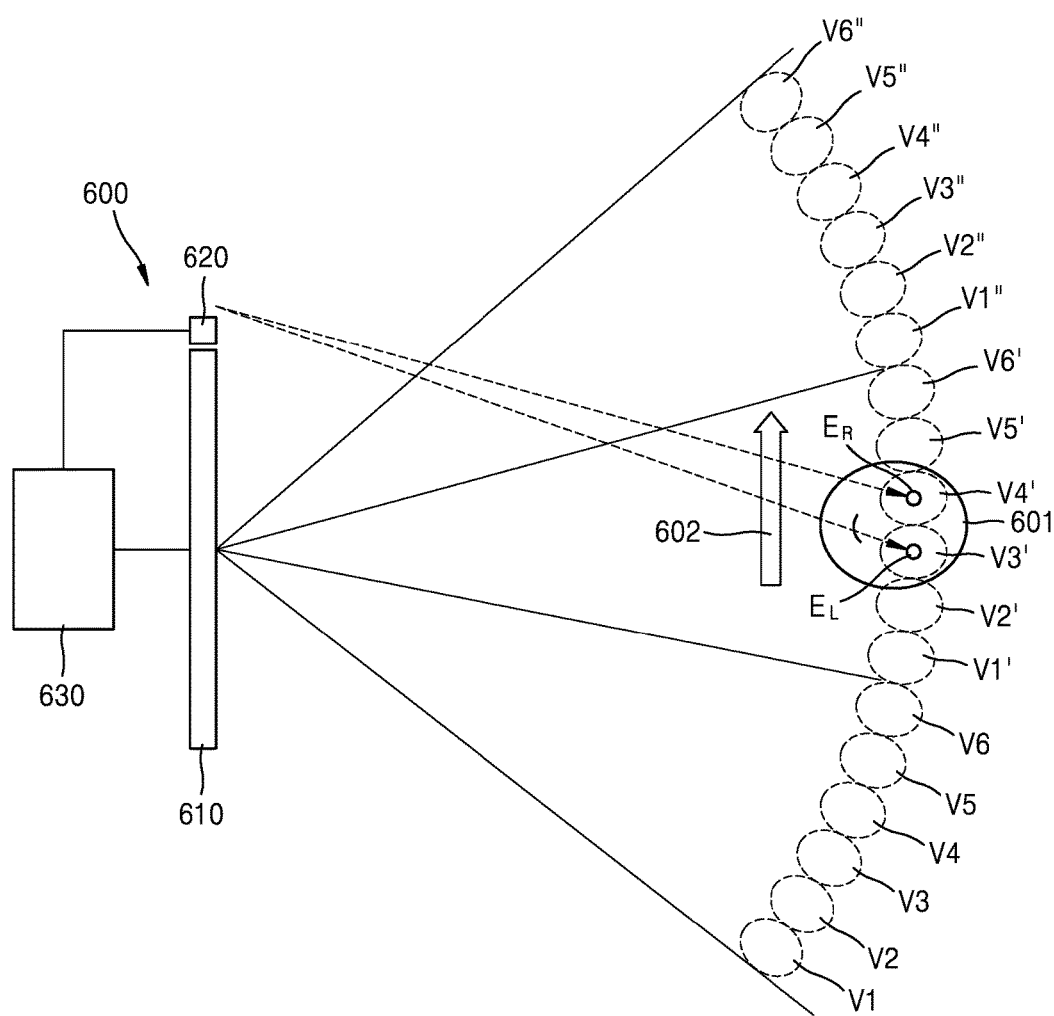
FIG. 9 is an exploded perspective view of a 3D image display apparatus, according to another exemplary embodiment.

FIG. 9 is an exploded perspective view of a 3D image display apparatus 600, according to another exemplary embodiment. Referring to FIG. 9, the 3D image display apparatus 600 according to the present exemplary embodiment includes a display unit (also referred to herein as a "display device" and/or as a "display") 610, an eye tracking device 620, and a controller 630 configured to control the display unit 610 and the eye tracking device 620.

The display unit 610 may be any of the 3D image display apparatuses according to the previously described exemplary embodiments. The eye tracking device 620 tracks a left eye $E_L$ and/or a right eye $E_R$ of a viewer 601. The eye tracking device 620 may include a camera, and extract and track the left eye $E_L$ and/or the right eye $E_R$ from a face image of the viewer 601 captured by the camera. A process of extracting the left eye $E_L$ and/or the right eye $E_R$ from the face image of the viewer 601 may be independently performed within the eye tracking device 620 or may be performed within the controller 630.

In an operation of the 3D image display apparatus 600 according to the present exemplary embodiment, for convenience of explanation, the display unit 610 forms six view points V1, V2, V3, V4, V5, and V6 for a first group, six view points V1', V2', V3', V4', V5', and V6' for a second group, and six view points V1", V2", V3", V4", V5", and V6" for a third group, and an inter-view interval is a binocular parallax interval. The first group of view points V1, V2, V3, V4, V5, and V6, the second group of view points V1', V2', V3', V4', V5', and V6', and the third group of view points V1", V2", V3", V4", V5", and V6" repeat the same image. The view points in each group have a binocular parallax. When the viewer 601 view points an image within the first group of view points V1, V2, V3, V4, V5, and V6, the second group of view points V1', V2', V3', V4', V5', and V6', or the third group of view points V1", V2", V3", V4", V5", and V6", the viewer 601 views a 3D stereoscopic image due to a binocular parallax. If the left eye $E_L$ of the viewer 601 is at the view point V3' and the right eye $E_R$ of the viewer 601 is at the view point V4' as shown in FIG. 9, the viewer 601 feels a stereoscopic effect due to a binocular parallax between an image shown at the view point V3' and an image shown at the view point V4'. However, when the viewer 601 moves to a side 602, the left eye $E_L$ of the viewer 601 may be at the view point V6' and the right eye $E_R$ of the viewer 601 is at the view point V1". However, according to the above-described exemplary embodiments, since an image shown at the view point V1" is substantially the same as an image shown at the view point V1', an image shown at the view point V6' and the image shown at the view point V1" may be mirror images. Accordingly, in the present exemplary embodiment, when the eye tracking device 620 detects that the left eye $E_L$ and the right eye $E_R$ of the viewer 601 are at a boundary between view points (for example, between the view points V6 and V1' and the view points V6' and V1") or the viewer 601 moves toward the boundary between the view points, the 3D image display apparatus 600 appropriately moves an image displayed on the display unit 610 in order to display an image having a proper binocular parallax before a viewer views a mirror image. For example, when the viewer 601 moves to the side 602 and thus the left eye $E_L$ of the viewer 601 is at the view point V6' and the right eye $E_R$ of the viewer 601 is at the view point V1", an image previously displayed at the first group of view points V1, V2, V3, V4, V5, and V6, the second group of view points V1', V2', V3', V4', V5', and V6', and the third group of view points V1", V2", V3", V4", V5", and V6" is moved to the side 602 so that the viewer 601 views an image having a proper binocular parallax.

Although a directional backlight unit, a 3D image display apparatus, and a 3D image displaying method according to one or more exemplary embodiments have been described with reference to the exemplary embodiments illustrated in the drawings in order to facilitate understanding of the present inventive concept, the illustrated embodiments are only examples, and various modifications to the illustrated embodiments and other equivalent embodiments may be possible. Therefore, the scope of the present inventive concept should be determined by the accompanying claims.

It should be understood that exemplary embodiments described herein should be considered in a descriptive sense only and not for purposes of limitation. Descriptions of features or aspects within each exemplary embodiment should typically be considered as available for other similar features or aspects in other embodiments.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A directional backlight device comprising:
   at least one light guide plate;
   a light source configured to provide light to the at least one light guide plate; and
   a first group of grating elements and a second group of grating elements disposed on an emission surface of the at least one light guide plate and configured to externally emit the light from the emission surface,
   wherein each of the first group of grating elements and the second group of grating elements is arranged such that light beams emitted by the first group of grating elements propagate through a plurality of pixel points spaced apart from the emission surface and form a first group of view points, that light beams emitted from the second group of grating elements propagate through the plurality of pixel points and form a second group of view points, and that a region within which the second group of view points is formed does not overlap with a region within which the first group of view points is formed.

2. The directional backlight device of claim 1, wherein the view points in the first group are consecutively arranged, and the view points in second group are consecutively arranged after the first group of view points.

3. The directional backlight device of claim 1, wherein at least two light beams propagate through each of the plurality of pixel points, and the at least two light beams comprise a first light beam emitted from one of the grating elements included in the first group and a second light beam emitted from one of the grating elements included in the second group.

4. The directional backlight device of claim 1, wherein light beams emitted from two adjacent grating elements among the first and second groups of grating elements are directed to different pixel points.

5. The directional backlight device of claim 1, wherein each of the first group of grating elements and the second group of grating elements includes a respective plurality of patterned grooves that are substantially parallel to one another.

6. The directional backlight device of claim 5, wherein the first and second groups of grating elements are different from each other with respect to at least one from among a grating length, a grating width, a grating depth, a grating orientation, a grating pitch, and a duty cycle.

7. The directional backlight device of claim 1, wherein at least two grating elements from within the first and second groups of grating elements are different from each other with respect to an arrangement interval.

8. The directional backlight device of claim 1, wherein intervals between adjacent pairs of grating elements in each of the first and second groups of grating elements and adjacent pairs of pixel points in the plurality of pixel points are substantially constant.

9. The directional backlight device of claim 1, wherein a number of grating elements included in the first group is equal to a number of pixel points included in the plurality of pixel points.

10. The directional backlight device of claim 1, wherein a number of grating elements included in the first group is equal to a number of grating elements included in the second group.

11. The directional backlight device of claim 1, wherein the at least one light guide plate comprises a single light guide plate.

12. The directional backlight device of claim 1, wherein the at least one light guide plate comprises a first light guide plate and a second light guide plate that are optically separated from each other, and
at least two of the grating elements included in the first and second groups are disposed on the first light guide plate, and all other grating elements included in the first and second groups are disposed on the second light guide plate.

13. The directional backlight device of claim 12, wherein a number of grating elements disposed on each of the first and second light guide plates is equal to a number of pixel points included in the plurality of pixel points.

14. The directional backlight device of claim 12, wherein the first group of grating elements is disposed on the first light guide plate and the second group of grating elements is disposed on the second light guide plate.

15. The directional backlight device of claim 12, wherein the first and second light guide plates are disposed side by side in a lateral direction.

16. The directional backlight device of claim 15, wherein the second light guide plate is inclined with respect to the first light guide plate.

17. The directional backlight device of claim 12, wherein the first light guide plate is stacked on the second light guide plate.

18. A directional backlight device comprising:
a light guide plate;
a light source configured to provide light to the light guide plate; and
a plurality of grating elements provided on an emission surface of the light guide plate and configured to externally emit the light from the emission surface such that the light propagates through a plurality of pixel points spaced apart from the emission surface,
wherein at least two of the plurality of grating elements match with each pixel point from among the plurality of pixel points, two adjacent grating elements match with different pixel points from among the plurality of pixel points, and light beams emitted from the at least two grating elements propagate through one pixel point matched with the at least two grating elements and then are simultaneously directed toward different view points.

19. The directional backlight device of claim 18, wherein an overall number of grating elements is an integer multiple of a number of pixel points included in the plurality of pixel points.

20. The directional backlight unit of claim 18, wherein the plurality of grating elements are arranged such that light beams emitted from the plurality of grating elements propagate through the plurality of pixel points and form a plurality of groups of view points and that regions within which different groups of view points are formed do not overlap with each other.

21. A three-dimensional (3D) image display apparatus comprising:
a directional backlight device comprising a light guide plate, a light source configured to provide light to the light guide plate, and first and second groups of grating elements disposed on an emission surface of the light guide plate and configured to externally emit the light from the emission surface;
a spatial light modulator comprising a plurality of pixels that modulate light beams emitted by the directional backlight device; and
a controller configured to control the directional backlight device and the spatial light modulator,
wherein the first and second groups of grating elements are arranged such that light beams emitted from the first group of grating elements propagate through the plurality of pixels of the spatial light modulator and form a first group of view points, that light beams emitted from the second group of grating elements propagate through the plurality of pixels of the spatial light modulator and form a second group of view points, and that a region within which the second group of view points is formed does not overlap with a region within which the first group of view points is formed.

22. The 3D image display apparatus of claim 21, wherein the view points in the first group are consecutively arranged, and the view points in second group are consecutively arranged after the first group of view points.

23. The 3D image display apparatus of claim 21, wherein at least two light beams propagate through each of the plurality of pixel points, and the at least two light beams comprise a first light beam emitted from one of the grating elements included in the first group and a second light beam emitted from one of the grating elements included in the second group.

24. The 3D image display apparatus of claim 21, wherein 3D images shown at the first group of view points are repeatedly shown at the second group of view points.

25. The 3D image display apparatus of claim 21, wherein the spatial light modulator comprises a plurality of sub-pixels for each pixel included in the plurality of pixels, and
each of the sub-pixels of the spatial light modulator transmits light beams emitted from at least two grating elements.

26. The 3D image display apparatus of claim 25, wherein each of the sub-pixels has a rectangular shape that is longer in a lengthwise direction and adjacent pairs of sub-pixels from among the plurality of sub-pixels in each pixel are arranged side by side in a widthwise direction thereof, and
in the lengthwise direction of the sub-pixels, an overall number of rows of the first and second groups of grating elements is an integer multiple of a number of rows of the sub-pixels.

27. The 3D image display apparatus of claim 21, further comprising an eye tracking device configured to track eyes of a viewer, wherein the controller is further configured to control the spatial light modulator so that pixels corresponding to the eyes of the viewer tracked by the eye tracking device generate an image.

28. A 3D image displaying method comprising:

providing light to a light guide plate;

arranging a plurality of grating elements comprising first and second groups of grating elements on an emission surface of the light guide plate such that the grating elements are configured to externally emit the light from the emission surface;

modulating emitted light beams by using a plurality of pixels of a spatial light modulator; and forming a first group of view points by facilitating a propagation of light beams emitted from the first group of grating elements through the plurality of pixels of the spatial light modulator, and forming a second group of view points by facilitating a propagation of light beams emitted from the second group of grating elements through the plurality of pixels of the spatial light modulator, wherein a region within which the second group of view points is formed does not overlap with a region within which the first group of view points is formed.

29. The 3D image displaying method of claim 28, wherein the view points in the first group are consecutively arranged, and the view points in the second group are consecutively arranged after the first group of view points.

30. The 3D image displaying method of claim 28, wherein at least two light beams propagate through each of the plurality of pixel points, and the at least two light beams comprise a first light beam emitted from one of the grating elements included in the first group and a second light beam emitted from one of the grating elements included in the second group.

31. The 3D image displaying method of claim 28, wherein light beams emitted from two adjacent grating elements from among the first and second groups of grating elements are directed to different pixels.

32. The 3D image displaying method of claim 28, wherein 3D images shown at the first group of view points are repeatedly shown at the second group of view points.

33. The 3D image displaying method of claim 28, further comprising tracking eyes of a viewer, wherein the spatial light modulator is controlled so that pixels corresponding to the tracked eyes of the viewer generate an image.

\* \* \* \* \*